United States Patent [19]

Clampitt

[11] 4,076,628

[45] * Feb. 28, 1978

[54] DRILLING FLUID COMPOSITIONS AND METHODS OF PREPARING SAME

[75] Inventor: Richard L. Clampitt, Barltesville, Okla.

[73] Assignee: Phillips Petroleum Company, Bartlesville, Okla.

[ * ] Notice: The portion of the term of this patent subsequent to Sep. 30, 1992, has been disclaimed.

[21] Appl. No.: 620,728

[22] Filed: Oct. 8, 1975

Related U.S. Application Data

[60] Division of Ser. No. 372,825, June 22, 1973, Pat. No. 3,921,733, which is a continuation-in-part of Ser. No. 224,914, Feb. 9, 1972, abandoned.

[51] Int. Cl.$^2$ .................................................. C09K 7/02
[52] U.S. Cl. .................................. 252/8.5 C; 175/65; 252/316

[58] Field of Search ............ 252/8.5 A, 8.5 C, 8.55 R, 252/8.55 D, 316; 175/65

[56] References Cited

U.S. PATENT DOCUMENTS

| | | | |
|---|---|---|---|
| 3,243,000 | 3/1966 | Patton et al. ...................... | 252/8.5 X |
| 3,256,657 | 8/1966 | Sinclair ............................... | 252/316 |
| 3,502,149 | 3/1970 | Pence ................................. | 252/8.55 X |
| 3,687,200 | 8/1972 | Routson ............................. | 166/295 |
| 3,757,863 | 9/1973 | Clampitt et al. ................. | 166/270 X |
| 3,900,406 | 8/1975 | Clampitt et al. ................. | 252/8.55 |
| 3,909,423 | 9/1975 | Hessert et al. ..................... | 252/8.55 |

*Primary Examiner*—Herbert B. Guynn

[57] ABSTRACT

Drilling fluid compositions comprising an aqueous gel prepared from water and certain polymers such as polyacrylamides and related polymers, and methods of preparing said compositions.

22 Claims, No Drawings

DRILLING FLUID COMPOSITIONS AND METHODS OF PREPARING SAME

This application is a division of pending application Ser. No. 372,825, filed June 22, 1973, now U.S. Pat. No. 3,921,733, which was a continuation-in-part of then pending application Ser. No. 224,914, filed Feb. 9, 1972, now abandoned.

This invention relates to drilling fluid compositions and methods of preparing said compositions.

Drilling fluids used in the drilling of oil wells, gas wells, and similar boreholes are commonly aqueous liquids containing clays or other colloidal materials. The drilling fluid serves as a lubricant for the bit and drill stem, as a carrying medium for the cuttings produced by the drill bit, and assists in the formation of a filter cake on the wall of the borehole for the reduction of fluid losses to the surrounding subsurface strata. It is known that excessive viscosity in the drilling fluid has an adverse effect on the penetration rate obtained by the drill bit. In many instances, substantially better rates can be secured by eliminating colloidal materials and reducing the viscosity of the drilling fluid. In some instances, air, clear water, or another similar fluid of low viscosity can be used in the place of the ordinary drilling fluid or mud.

The present invention provides a solution for the above-described problems. We have now discovered that certain aqueous gels, described hereinafter, can comprise at least a portion of the aqueous medium used in said well drilling operations. Said gels are prepared from certain water-dispersible polymers, e.g., polyacrylamides, which when used in combination with a water-soluble compound of a polyvalent metal which can be reduced to a lower polyvalent valence state and a suitable reducing agent capable of reducing said polyvalent metal to said lower polyvalent valence state, can be used as gelling agents to gel aqueous mediums comprising water. By varying the composition and/or amounts of said gelling agents, and/or the conditions under which they are used in forming the gels, a wide range of aqueous gels ranging from liquid highly mobile gels to thick, viscous, somewhat elastic gels can be produced.

Said aqueous gels are particularly useful in operations wherein a fluid medium is introduced into a borehole in the earth, e.g., in the abovedescribed well drilling operations.

Thus, according to the invention, there is provided, a water-base drilling fluid useful in drilling a well, comprising: water; a waterthickening amount of a water-dispersible polymer selected from the group consisting of: polyacrylamides and polymethacrylamides wherein up to about 75 percent of the carboxamide groups can be hydrolyzed to carboxyl groups; crosslinked polyacrylamides and crosslinked polymethacrylamides wherein up to about 75 percent of the carboxamide groups can be hydrolyzed to carboxyl groups; polyacrylic acid and polymethacrylic acid; polyacrylates; polymers of N-substituted acrylamides wherein the nitrogen atoms in the carboxamide groups can have from 1 to 2 alkyl substituents which contain from 1 to 4 carbon atoms, and wherein up to about 75 percent of the carboxamide groups can be hydrolyzed to carboxyl groups; copolymers of acrylamide or methacrylamide with another ethylenically unsaturated monomer copolymerizable therewith, sufficient acrylamide or methacrylamide being present in the monomer mixture to impart said water-dispersible properties to the resulting copolymer when it is mixed with water, and wherein up to about 75 percent of the carboxamide groups can be hydrolyzed to carboxyl groups; and mixtures of said polymers; an amount of a water-soluble compound of a polyvalent metal wherein the metal present is capable of being reduced to a lower polyvalent valence state and which amount is sufficient to cause gelation of said water containing said polymer when the valence of at least a portion of said metal is reduced to said lower valence state; an amount of a water-soluble reducing agent which is effective to reduce at least a portion of said metal to said lower valence state and cause said gelation; and sufficient suspended finely divided solids to form a filter cake on the wall of said well.

Still further according to the invention, there is provided a method for preparing a water-base drilling fluid comprising an aqueous gel, and useful in drilling a well, which method comprises incorporating into water: a water-thickening amount of a water-dispersible polymer selected from the group consisting of: polyacrylamides and polymethacrylamides wherein up to about 75 percent of the carboxamide groups can be hydrolyzed to carboxyl groups; crosslinked polyacrylamides and crosslinked polymethacrylamides wherein up to about 75 percent of the carboxamide groups can be hydrolyzed to carboxyl groups; polyacrylic acid and polymethacrylic acid; polyacrylates; polymers of N-substituted acrylamides wherein the nitrogen atoms in the carboxamide groups can have from 1 to 2 alkyl substituents which contain from 1 to 4 carbon atoms, and wherein up to about 75 percent of the carboxamide groups can be hydrolyzed to carboxyl groups; copolymers of acrylamide or methacrylamide with another ethylenically unsaturated monomer copolymerizable therewith, sufficient acrylamide or methacrylamide being present in the monomer mixture to impart said water-dispersible properties to the resulting copolymer when it is mixed with water, and wherein up to about 75 percent of the carboxamide groups can be hydrolyzed to carboxyl groups; and mixtures of said polymers; an amount of a water-soluble compound of a polyvalent metal wherein the metal present is capable of being reduced to a lower polyvalent valence state and which amount is sufficient to cause gelation of said water containing said polymer when the valence of at least a portion of said metal is reduced to said lower valence state; an amount of a water-soluble reducing agent which is effective to reduce at least a portion of said metal to said lower valence state and cause said gelation; and sufficient suspended finely divided solids to form a filter cake on the wall of said well.

Herein and in the claims, unless otherwise specified, the term "polymer" is employed generically to include both homopolymers and copolymers; and the term "water-dispersible polymers" is employed to include those polymers which are truly water-soluble and those polymers which are dispersible in water or other aqueous medium to form stable colloidal suspensions which can be gelled as described herein.

Polymers which can be used in the practice of the invention include the various polyacrylamides and related polymers which are water-dispersible and which can be used in an aqueous medium, with the gelling agents described herein, to give an aqueous gel. Presently preferred polymers include the various substantially linear homopolymers and copolymers of acrylamide and methacrylamide. By substantially linear it is meant that the polymers are substantially free of crosslinking between the polymer chains. Said polymers can have up to about 75, preferably up to about 45, percent of the carboxamide groups hydrolyzed to carboxyl groups. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

Substantially linear polyacrylamides can be prepared by methods known in the art. For example, the polymerization can be carried out in aqueous medium, in the presence of a small but effective amount of a water-soluble oxygen-containing catalyst, e.g., a thiosulfate or bisulfate of potassium or sodium or an organic hydroperoxide, at a temperature between about 30° and 80° C. The resulting polymer is recovered from the aqueous medium, as by drum drying, and can be subsequently ground to the desired particle size. A presently preferred particle size is such that about 90 weight percent will pass through a number 10 mesh sieve, and not more than about 10 weight percent will be retained on a 200 mesh sieve (U.S. Bureau of Standards Sieve Series).

Included among the copolymers which can be used in the practice of the invention are the water-dispersible copolymers resulting from the polymerization of a major proportion of acrylamide or methacrylamide and a minor proportion of an ethylenically unsaturated monomer copolymerizable therewith. It is desirable that sufficient acrylamide or methacrylamide be present in the monomers mixture to impart to the copolymer the above-described water-dispersible properties, for example, from about 90 to 99 percent acrylamide and from about 1 to 10 percent other ethylenically unsaturated monomers. Such other monomers include acrylic acid, methacrylic acid, vinylsulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, and the like. Various methods are known in the art for preparing said copolymers. For example, see U.S. Pat. Nos. 2,625,529; 2,740,522; 2,729,557; 2,831,841; and 2,909,508. Said copolymers can also be used in the hydrolyzed form, as discussed above for the homopolymers.

Polyacrylic acids, including polymethacrylic acid, prepared by methods known in the art, can also be used in the practice of the invention.

Polyacrylates, e.g., as described in Kirk-Othmer, "Encyclopedia of Chemical Technology", Vol. 1, second edition, pages 305 et seq., Interscience Publishers, Inc., New York (1963), can also be used in the practice of the invention. Examples of said polyacrylates include polymers of methyl acrylate, ethyl acrylate, n-propyl acrylate, isopropyl acrylate, n-butyl acrylate, isobutyl acrylate, tert-butyl acrylate, n-octyl acrylate, and the like.

Polymers of N-alkyl-substituted acrylamides wherein the nitrogen atoms in the carboxamide groups can have from 1 to 2 alkyl substituents which contain from 1 to 4 carbon atoms can also be used in the practice of the invention. Examples of said N-substituted acrylamides include, among others, N-methyl acrylamide, N-propyl acrylamide, N-butyl acrylamide, N,N-dimethyl acrylamide, N-methyl-N-sec-butyl acrylamide, and the like, at various stages of hydrolysis, as described above.

Crosslinked polyacrylamides and crosslinked polymethacrylamides, at various stages of hydrolysis as described above, can also be used in the practice of the invention. In general, said crosslinked polyacrylamides can be prepared by the methods described above, but including in the monomeric mixture a suitable amount of a suitable crosslinking agent. Examples of crosslinking agents include methylenebisacrylamide, divinylbenzene, vinyl ether, divinyl ether, and the like. Said crosslinking agents can be used in small amounts, e.g., up to about 1 percent by weight of the monomeric mixture. Such crosslinking is to be distinguished from any crosslinking which occurs when solutions of polymers are gelled as described herein.

Mixtures of the above-described polymers can also be used in the practice of the invention. All the polymers useful in the practice of the invention are characterized by high molecular weight. The molecular weight is not critical so long as the polymer has the above-described water-dispersible properties. It is preferred that the polymer have a molecular weight of at least 100,000. The upper limit of molecular weight is unimportant so long as the polymer is water-dispersible, and the aqueous gel prepared therefrom can be pumped. Thus, polymers having molecular weights as high as 20,000,000 or higher, and meeting said conditions, can be used.

The amount of said polymers used in the practice of the invention can vary widely depending upon the particular polymer used, the purity of said polymer, and properties desired in said aqueous gels. In general, the amount of polymer used will be a water-thickening amount, i.e., at least an amount which will significantly thicken the water to which it is added. For example, amounts in the order of 25 to 100 parts per million weight (0.0025 to 0.01 weight percent) have been found to significantly thicken water. For example, distilled water containing 25 ppm of a polyacrylamide having a molecular weight of about $10 \times 10^6$ has a viscosity increase of about 41 percent. At 50 ppm the viscosity increase is about 106 percent. At 100 ppm the viscosity increase is about 347 percent. As another example, distilled water containing 25 ppm of a polyacrylamide having a molecular weight of about $3.5 \times 10^6$ has a viscosity increase of about 23 percent. At 50 ppm the viscosity increase is about 82 percent. At 100 ppm the viscosity increase is about 241 percent. Generally speaking, amounts in the range of from 0.0025 to 5, preferably from 0.01 to 1.5, more preferably 0.025 to 0.4, weight percent, based on the weight of water, can be used. However, amounts outside said ranges can be used. In general, with the proper amounts of polyvalent metal and reducing agent, the amount of polymer used will determine the consistency of the gel obtained. Small amounts of polymer will usually produce liquid mobile gels which can be readily pumped whereas large amounts of polymer will usually produce thick, viscous, somewhat elastic gels. If desired, said thick gels can be "thinned" by dilution with water to any desired concentration of polymer. This can be done by mechanical means, e.g., stirring, pumping, or by means of a suitable turbulence inducing device to cause shearing, such as a jet nozzle. Thus, there is really no fixed upper limit on the amount of polymer which can be used.

However, we have discovered that when a liquid mobile gel is desired, it is definitely preferred to first prepare a concentrated gel and dilute the more concentrated gels before they become too viscous. In general, dilute gels are more difficult to prepare in that, for one thing, gelling times are longer. More importantly for some reason not yet completely understood, the gels are usually more effective in their intended uses when a concentrated gel is first prepared and then diluted to the desired concentration. Another advantage is that, in general, less gelling agents are required for a given viscosity.

Metal compounds which can be used in the practice of the invention are water-soluble compounds of polyvalent metals wherein the metal is present in a valence state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability are the presently preferred metal-containing compounds for use in the practice of the invention. The hexavalent chromium in said chromium compounds is reduced in situ to trivalent chromium by suitable reducing agents, as discussed hereinafter. In the permanganage compounds the manganese is reduced from +7 valence to +4 valence as in $MnO_2$.

The amount of said metal-containing compounds used in the practice of the invention will be a sensible amount, i.e., a small but finite amount which is more than incidental impurities, but which is effective or sufficient to cause subsequent gelation when the metal in the polyvalent metal compound is reduced to a lower polyvalent valence state. The lower limit of the concentration of the starting metal-containing compound will depend upon several factors including the particular type of polymer used, the concentration of the polymer in the water to be gelled, the water which is used, and the type of gel product desired. For similar reasons, the upper limit on the concentration of the starting metal-containing compound also cannot always be precisely defined. However, it should be noted that excessive amounts of the starting metal compound, for example +6 chromium, which can lead to excessive amounts of +3 chromium when there is sufficient reducing agent present to reduce the excess +6 chromium, can adversely affect the stability of the gels produced. As a general guide, the amount of the starting polyvalent metal-containing compound used in preparing aqueous gels in accordance with the invention will be in the range of from 0.05 to 60, preferably 0.5 to 30, weight percent of the amount of the polymer used. Stated another way, the amount of the starting polyvalent metal-containing compound used will usually be an amount sufficient to provide at least about $3 \times 10^{-6}$, preferably at least $3 \times 10^{-5}$, gram atoms of said metal capable of being reduced per gram of polymer. Preferably, the amount of said metal capable of being reduced which is used will not exceed $4 \times 10^{-3}$, more preferably $2 \times 10^{-3}$, gram atoms of said metal per gram of polymer. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by simple experiments carried out in the light of this disclosure. For example, when brines, such as are commonly available in producing oil fields, are used in the water in preparing gels for use in the practice of the invention, less of the starting polyvalent metal-containing compound is required than when distilled water is used. Stable gels have been prepared using brines having a wide range of dissolved solids content, e.g., from 850, 1,200, 6,000, and 60,000 ppm total dissolved solids, depending upon the particular polymer and brine used. Gelation rates are frequently faster when using said brines. Such oil field brines commonly contain varying amounts of sodium chloride, calcium chloride, magnesium chloride, etc. Sodium chloride is usually present in the greatest concentration. The word "water" is used generically herein and in the claims, unless otherwise specified, to include such brines, fresh water, and other aqueous media which can be gelled in accordance with the invention.

Water having a low (or essentially none) total dissolved solids content is the preferred medium for preparing the gels described herein. Preferably, when brines are used the total dissolved solids content should not be greater than about 60,000, more preferably not greater than about 40,000 ppm, by weight. Of said total dissolved solids, the amount of polyvalent metal ions such as calcium, magnesium, etc., should preferably not be greater than about 6,000, more preferably not greater than about 3,000 ppm by weight.

Suitable reducing agents which can be used in the practice of the invention include sulfur-containing compounds such as sodium sulfite, sodium hydrosulfite, sodium metabisulfite, potassium sulfite, sodium bisulfite, potassium hydrosulfite, potassium metabisulfite, sodium sulfide, sodium thiosulfate, ferrous sulfate, thioacetamide, hydrogen sulfide, and others; and nonsulfur-containing compounds such as hydroquinone, ferrous chloride, p-hydrazinobenzoic acid, hydrazine phosphite, hydrazine dichloride, and others. Some of the above reducing agents act more quickly than others, for example, sodium thiosulfate usually reacts slowly in the absence of heat, e.g., heating to about 125°-130° F. The presently most preferred reducing agents are sodium hydrosulfite or potassium hydrosulfite.

The amount of reducing agent to be used in the practice of the invention will be a sensible amount, i.e., a small but finite amount which is more than incidental impurities, but which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent to said lower polyvalent valence state, e.g., +6 Cr to +3 Cr. However, in some instances, it may be desirable to use amounts of reducing agent outside said ranges. The use of such amounts is within the scope of the invention. Those skilled in the art can determine the amount of reducing agent to be used by simple experiments carried out in the light of this disclosure.

Various methods can be used for preparing the aqueous gels used in the practice of the invention. Either the metal-containing compound or the reducing agent can be first added to a solution or dispersion of the polymer in water or other aqueous medium, or said metal-containing compound and said reducing agent can be added simultaneously to the solution or aqueous medium containing the polymer. Generally speaking, where convenient, the preferred method is to first disperse the polymer in the water or other aqueous medium. The reducing agent is then added to the dispersion of polymer, with stirring. The metal-containing compound is then added to the solution or aqueous medium containing the polymer and the reducing agent, with stirring. Gelation starts as soon as reduction of some of the higher valence metal in the starting polyvalent metal-containing compound to a lower valence state occurs. The newly formed lower valence metal ions, for example $+3$ chromium obtained from $+6$ chromium, effect rapid crosslinking of the polymer and gelation of the solution or aqueous medium containing same.

It is also within the scope of the invention to prepare a dry mixture of the polymer, the metal-containing compound and the reducing agent, in proper proportions, and then add this dry mixture to the proper amount of water.

An advantage of the invention is that ordinary ambient temperatures and other conditions can be used in practically all instances in preparing the aqueous gels used in the practice of the invention or aqueous mediums containing same. However, in some instances, a small amount of heat may be desirable to aid in the formation of the gel, e.g., heating to a temperature of about 125°–130° F.

Aqueous gels used in the practice of the invention can be prepared having a wide range of viscosities or firmness ranging from low viscosity or highly mobile gels having a relatively low viscosity up to thick, viscous, somewhat elastic gels which are relatively nonmobile. The choice of gel viscosity or concentration will depend upon the use to be made of the gel. The actual viscosity and/or gel strength of the gel will depend upon the type and concentration of the polymer, the type and amount of starting polyvalent metal compound used, and the type and amount of reducing agent used.

One presently preferred procedure is to prepare a relatively concentrated or high viscosity gel and dilute same to a viscosity or concentration suited for the actual use of the gel. In many instances, this procedure results in a more stable gel, in addition to the advantages mentioned above.

When employing said dilution technique a starting solution or dispersion of polymer containing, for example, 1,000 to 10,000 ppm (0.1 to 1 wt. %) or more of polymer can be used. This solution or dispersion is then gelled by the addition of suitable amounts of polyvalent metal compound and reducing agent. After gelation has proceeded to the desired extent, the resulting gel can be diluted with water to the concentration or viscosity most suited for its intended use. For example, it could be diluted to a nominal 4,000, 2,500, 1,000, 500, 250, or less, ppm gel by the addition of a suitable amount of water. The more concentrated polymer solutions or dispersions usually have a faster rate of gelation. Thus, in most instances, it will be preferred to carry out the dilution soon after the components of the gel have been added to the water or other aqueous medium, e.g., within about 5 to 30 minutes. Preferably, the concentration of the polymer in the "concentrated gel" will be at least twice that in the final gel. Dilution of the gel retards the rate of gelation. Thus, this dilution technique can be employed to control the gelation rate, if desired. In many instances, gels prepared by employing said dilution technique are more stable. Another advantage of said dilution technique is that it is usually more convenient to weigh out and handle the larger quantities of reagents.

We are aware that chromium ions having a valence of $+3$ have been used to react with water-dispersible polymers such as polyacrylamides and polysaccharides. See, for example, U.S. Pat. No. 3,114,651 to Gentile and U.S. Pat. No. 3,383,307 to Goetz. In such processes the chromium compound is added in a form wherein the chromium has an initial valence of $+3$, e.g., $CrCl_3$, $Cr(NO_3)_3$, etc. In the practice of the present invention, the $Cr^{+3}$ ions must be newly formed, e.g., nascent ions formed in situ in the solution to be gelled by the reduction of $Cr^{+6}$ ions to $Cr^{+3}$ ions. I have found that aqueous gels of polymer solutions prepared using such newly formed $Cr^{+3}$ ions have much better long term stability than do gels prepared by the direct addition of $Cr^{+3}$ ions.

Gel instability is evidenced by precipitation and/or syneresis (bleeding or water separation). A severe test of gel stability is to prepare the gel and merely allow it to stand. We have found that gels which are stable for as long as 48 hours are usually stable for a month or longer. I have also found that formation solids such as sandstone and limestone improve gel stability.

Generally speaking, the pH of the final solution of the gelling reagents is preferably less than 7, more preferably in the order of 6. In general, pH is not controlling, but higher pH values retard gelation rate. In general, the pH of the gelling solution will depend upon the reducing agent used. If desired, the pH can be adjusted by the addition of a suitable acid, depending upon the reducing agent used.

Herein and in the claims, unless otherwise specified, the aqueous gels used in the practice of the invention are defined for convenience, and not by way of limitation, in terms of the amount of polymer contained therein, irrespective of whether or not all the polymer has entered into the gel-forming reaction. For example, a 1 weight percent or 10,000 gel is a gel which was prepared from a starting polymer solution or dispersion which contained 1 weight percent or 10,000 ppm by weight of polymer. The same system is employed for the gels prepared by the above-described dilution technique.

The above-described aqueous gels can comprise, or can be employed as, drilling fluids in the drilling of wells in any manner known to the art for the use of drilling fluids. Such gels can be employed without the addition of other materials thereto. However, if desired, weighting agents such as barium carbonate, barium sulfate, amorphous silica, etc., can be included in the drilling fluids comprising said aqueous gels. If desired, other additives compatible with the aqueous gels can also be included in the drilling fluid. Thus, the drilling fluids can include clays such as bentonite, attapulgus clay, fluid loss agents, etc. It should be understood that not all of these additives or constituents will necessarily be present in any one drilling fluid and that the amount of any particular additive used will be governed by the other constituents present under the particular well conditions existing. As indicated, in selecting such additives for use in a particular drilling fluid, care should be taken to avoid materials which are not compatible with the aqueous gels. The use of such additives will be governed in part by the viscosity and fluid loss properties desired in the drilling fluid. Thus, as is the situation in connection with conventional drilling fluids, pilot tests should be run to determine the properties desired for the aqueous gel used as the drilling fluid, or an aqueous gel containing one of the above-described additives, to determine the optimum results or properties desired for the drilling fluid under the particular well conditions existing.

Based on the data in the examples set forth hereinafter, low solids drilling fluids comprising the aqueous gels described herein offer several particularly advantageous applications. Such drilling fluids can be used as flush drilling fluids, e.g., where it is desired to clean the hole periodically so that a complete "mud-up" can be delayed. This permits the usual early water drilling and the resulting faster penetration to be extended to a greater depth. In flush drilling operations the initial viscosity at low shear rates (100 and 6 rpm of a Fann VG meter) is important as a measure of carrying capacity. In flush drilling the fluid normally circulates through the hole only once. Such drilling fluids can also be used in normal drilling with controlled properties, e.g., where it is wished to increase viscosity at low shear rates for good carrying capacity and suspending ability.

In the drilling art, low solids drilling fluids are generally considered to include those drilling fluids which contain up to about 5, frequently only up to about 3, volume percent of finely divided clay solids dispersed therein. A wide variety of such clay solids are known in the art and are commercially available. Examples of such clay solids include bentonite, attapulgus clay, the various other montmorillonite clays, P95 rotary clay, and others. Bentonite is the most commonly used clay. Said finely divided solids are preferably ground until at least about 90 percent will pass through a 325 mesh screen. The most commonly used low solids drilling fluids are the water base drilling fluids.

The aqueous gels described herein can be incorporated into said low solids drilling fluids in any suitable amount sufficient to give the desired results, e.g., increase the viscosity of the drilling fluid at low shear rates. For economic reasons it will be desirable to keep the amount of gel used relatively small, commensurate with the results desired in any particular well application. As a guide to those skilled in the art, in most instances the amount of aqueous gel used in said low solids drilling fluids will be in the range of from 0.05 to about 1.5, preferably 0.1 to about 1, pound per barrel of drilling fluid. However, it is within the scope of the invention to use amounts of aqueous gels outside said ranges, depending upon particular well applications.

As shown by the examples given hereinafter, said aqueous gels used in the low solids drilling fluids can be prepared separately and then incorporated into the low solids drilling fluid; or the components necessary for the formation of the gel can be mixed with the other components of the drilling fluid, e.g., water and finely divided solids, and gelation effected in the presence of the finely divided solids. When said gels are prepared separately, they can be prepared by any of the above-described methods. When gelation is effected in the presence of said finely divided solids it is sometimes convenient to express the concentrations of the polymer and the gelling agents in terms of pounds per barrel of drilling fluid in accordance with customary drilling art practice.

In the above description of drilling fluids containing said aqueous gels in accordance with the invention, particular reference has been made to using said gels in low solids drilling fluids. However, the invention is not so limited. Said aqueous gels can also be used, in the same proportions, in drilling fluids which are normally considered high solids fluids in the drilling art. For example, drilling fluids containing up to about 12 volume percent of finely divided solids, or higher. Thus, generally speaking, said aqueous gels can be used in water-base drilling fluids containing sufficient finely divided solids to form a filter cake on the wall of well, e.g., from about 1 to about 12 volume percent, or higher.

The following examples will serve to further illustrate the invention.

EXAMPLE I

A series of runs was made to illustrate the formation of aqueous gels. For these runs a stock solution was prepared by dissolving 6 grams of a substantially linear polyacrylamide in two liters of Bartlesville tap water. Said polyacrylamide was a commercially available material having a molecular weight of about $10 \times 10^6$, a nitrogen content of about 12 weight percent, and was about 21 percent hydrolyzed. The resulting solution contained about 3000 ppm of said polyacrylamide. To individual 200 ml portions of this stock solution there were added varying amounts of a 10 weight percent solution of $Na_2S_2O_4$ in distilled water, with stirring for 10 seconds; and then varying amounts of a 10 weight percent solution of $Na_2Cr_2O_7.2H_2O$ in distilled water, with stirring for 10 minutes. Stable gels were formed in each instance. The results of these test runs are set forth below.

| No. | $Na_2Cr_2O_7 \cdot 2H_2O$ grams | $Na_2S_2O_4$ grams | Apparent Viscosities, cp[1] | |
|---|---|---|---|---|
| | | | 1 minute | 48 hours |
| 1 | 0 | 0 | 28 | 30 |
| 2 | 0.025 | 0.025 | 38 | 37 |
| 3 | 0.05 | 0.05 | 49 | 36 |
| 4 | 0.05 | 0.10 | 35 | 56 |
| 5 | 0.10 | 0.10 | 41 | 47.5 |
| 6 | 0.10 | 0.15 | 34 | 53 |
| 7 | 0.15 | 0.15 | 28 | 50 |
| 8 | 0.25 | 0.25 | 42 | 80 |

[1]Model 35, Fann VG meter (300 rpm)

The above data indicate that with increasing amounts of $Na_2Cr_2O_7.2H_2O$, with sufficient reducing agent present to reduce $Cr^{+6}$ to $Cr^{+3}$, the rate of gelation increases. The data also indicate that for a given amount of $Na_2Cr_2O_7.2H_2O$, as the amount of reducing agent present increases, the overall rate of gelation increases.

EXAMPLE II

This example illustrates the utility of aqueous gels of a linear polyacrylamide as drilling fluids. Three drilling fluids were prepared and the viscosities thereof adjusted to be essentially the same at a shear rate of 511 reciprocal seconds (300 rpm on a Model 35, Fann VG meter). Thus, the viscosity behavior of all three fluids could be compared at shear rates above and below 511 reciprocal seconds. Each of said fluids was prepared by sifting the dry components thereof into 280 ml. of distilled water while stirring at low speed on a Hamilton Beach malt mixer. All fluids were then stirred 10 minutes with a Multimixer. The viscosities were then adjusted by dilution with water to be essentially the same as the viscosity of the lowest viscosity fluid. Final compositions of the fluids were as follows:

A. Dispersed bentonite fluid = 33 ppb (pounds per barrel) of bentonite, 3.3 ppb of ferrochrome lignosulfonate, and 0.943 ppb of NaOH, in Bartlesville tap water.

B. Polyacrylamide fluid = 1.75 ppb of a substantially linear polyacrylamide having a degree of hydrolysis of about 21 percent and a nitrogen content of about 11.9 percent, in Bartlesville tap water.

C. Gelled Polyacrylamide fluid = 1.69 ppb of said polyacrylamide, 0.483 ppb of $Na_2Cr_2O_7.2H_2O$, and 0.483 ppb of $Na_2S_2O_4$, in Bartlesville tap water. This gel thus contained about 0.48 weight percent or 4800 ppm of said polyacrylamide.

Viscosity values at different shear rates and gel strength values were then determined on each of the three fluids. The results of these tests are set forth in Table I below.

TABLE I

| Fluid | Shear rate, sec$^{-1}$<br>Fann, rpm | Fann Deflection Reading, at stated shear rate* | | | | | | Gels | |
|---|---|---|---|---|---|---|---|---|---|
| | | 1022<br>600 | 511<br>300 | 341<br>200 | 170<br>100 | 10.2<br>6 | 5.1<br>3 | 10 sec. | 10 min. |
| A | | 64 | 34 | 24 | 13 | 0 | 0 | 0 | 1 |
| B | | 43 | 33 | 28 | 21 | 8 | 6 | 8 | 9 |
| C | | 51 | 35 | 28 | 19 | 3 | 2 | 2 | 2 |

*Fann Apparent Viscosity = $\dfrac{300 \times \text{deflection (direct reading)}}{\text{rpm}}$ for spring constant F = 1, and R1-B1 rotor-bob combination, standard for drilling fluid testing.
Fann VG meter constants for Model 35:
Shear stress, dynes/cm$^2$ = 5.077 times deflection
Shear rate, reciprocal seconds = 1.704 times rpm Apparent viscosity, cp = $\dfrac{\text{Shear stress, dynes/cm}^2}{\text{Shear rate, sec}^{-1}} \times 100$ The data in the above Table I show that the gelled polyacrylamide solutions have utility as drilling fluids. Said data show that the gelled solution of polyacrylamide (Fluid C) has a lower apparent viscosity at high shear rates (600 rpm) than does the bentonite drilling fluid (Fluid A). This property will facilitate penetration of the drilling bit because penetration rate is normally considered an inverse function of apparent viscosity at high shear conditions. Thus, based on these data, the gelled polyacrylamide solution drilling fluids of the invention will permit higher drilling rates than the ordinary bentonite drilling fluid. Said data also show that the gelled solution of polyacrylamide has a higher apparent viscosity at the lower shear rates (100, 6, and 3 rpm) than does the bentonite drilling fluid. Thus, based on these data, the gelled polyacrylamide solution drilling fluid will permit at least as good, or better, suspension of solids in the annulus for cleaning of the borehole as will the bentonite drilling fluid. This conclusion is confirmed by the data on the gels.

EXAMPLE III

This example illustrates the utility of aqueous gels of polyacrylamides in low solids drilling fluids. A base low solids drilling fluid containing 10 ppb (pounds per barrel) of P95 Rotary clay and 10 ppb of bentonite in Bartlesville tap water was prepared in conventional manner. A base solution containing 0.5 percent (5000 ppm) of the same polyacrylamide as in Example II was also prepared, using Bartlesville tap water. Sample drilling fluid No. 1 was prepared by mixing 240 ml. of said base low solids drilling fluid and 40 ml. of said base polyacrylamide solution. Sample drilling fluid No. 2 was prepared by mixing 240 ml. of said base low solids drilling fluid and 40 ml. of said base polyacrylamide solution, and then mixing therewith sufficient $Na_2Cr_2O_7.2H_2O$ (10% solution) and $Na_2S_2O_5$ (5% solution) to crosslink said polyacrylamide and cause gelation. Sample drilling fluid No. 3 was prepared similarly as No. 2 except that the 40 ml. of base polyacrylamide solution was gelled before being mixed with the base low solids fluid. Sample drilling fluid No. 4 was prepared by mixing 200 ml. of said base low solids drilling fluid and 80 ml. of said base polyacrylamide solution, and sufficient of said $Na_2Cr_2O_7.2H_2O$ and said $Na_2S_2O_5$ solutions to crosslink said polyacrylamide and cause gelation. The resultant concentrations of said sample drilling fluids are given in Table II below.

TABLE II

| Fluid No. | Bentonite ppb | P95 Clay ppb | Polymer ppb | $Na_2Cr_2O_7 \cdot 2H_2O$ ppb | $Na_2S_2O_5$ ppb |
|---|---|---|---|---|---|
| 1 | 8.57 | 8.57 | 0.25 | 0 | 0 |
| 2 | 8.57 | 8.57 | 0.25 | 0.048 | 0.048 |
| 3 | 8.57 | 8.57 | 0.25 | 0.08 | 0.08 |
| 4 | 6.29 | 6.29 | 0.50 | 0.16 | 0.16 |

Viscosity values at different shear rates and gel strength values were then determined on each of said drilling fluids. The results of these tests are set forth in Table III below.

TABLE III

| Fluid | Shear rate, sec$^{-1}$<br>Fann, rpm | Apparent Viscosity, cp. v. shear rate | | | | | | Gels | |
|---|---|---|---|---|---|---|---|---|---|
| | | 1022<br>600 | 511<br>300 | 341<br>200 | 170<br>100 | 10.2<br>6 | 5.1<br>3 | 10 sec. | 10 min. |
| | | Initial Tests | | | | | | | |
| 1 | | 18 | 18 | 19.5 | 24 | 50 | 0 | 1 | 2 |
| 2 | | 27 | 29 | 37.5 | 51 | 150 | 150 | 3 | 9 |
| 3 | | 33.5 | 46 | 52.5 | 66 | 200 | 250 | 3 | 6 |
| 4 | | 40 | 52 | 64.5 | 69 | 325 | 500 | 15 | 50 |
| | | Tests Repeated after Shearing (10 min. Stirring on Multimixer) | | | | | | | |
| 1 | | 8 | 9.5 | 10.5 | 10.5 | 0 | 0 | 0 | 0 |
| 2 | | 8.3 | 9.5 | 10.5 | 12 | 0 | 0 | 0 | 5 |

TABLE III-continued

| | | | | | | | | |
|---|---|---|---|---|---|---|---|---|
| 3 | 10 | 12.5 | 14.3 | 16.5 | 0 | 0 | 0 | 2 |
| 4 | 13.8 | 17.5 | 21 | 30 | 75 | 50 | 2 | 18 |
| Let Fluids Set 3 Hours & Retested Without Agitation | | | | | | | | |
| 1 | 11.5 | 14 | 15 | 18 | 0 | 0 | 0 | 0 |
| 2 | 14.5 | 18 | 21 | 27 | 50 | 50 | 1 | 5 |
| 3 | 14 | 16 | 19.5 | 24 | 50 | 0 | 1 | 3 |
| 4 | 29 | 40 | 48 | 69 | 250 | 300 | 5 | 9 |
| Fluids Aged 18 Hours More & Retested Without Agitation | | | | | | | | |
| 1 | 13 | 15 | 16.5 | 18 | 0 | 0 | 0 | |
| 2 | 16.5 | 21 | 24.8 | 30 | 100 | 100 | 1 | 4 |
| 3 | 16 | 20 | 21 | 27 | 0 | 0 | 0 | 2 |
| 4 | 31 | 41 | 48.5 | 66 | 250 | 300 | 5 | 9 |

The data in the above Table III show that the gelled polyacrylamide solutions also have utility when used in drilling fluids having clay solids dispersed therein, e.g., low solids drilling fluids. Said data show that low solids drilling fluids Nos. 2, 3, and 4 which had gelled polyacrylamide solution incorporated therein were, in general, more shear thinning than low solids drilling fluid No. 1 which had ungelled polyacrylamide solution incorporated therein. This is a desirable property in that it will permit higher penetration rates. Said drilling fluids Nos. 2, 3 and 4 behave more like a Bingham plastic fluid at low shear rates than does said drilling fluid No. 1. Said drilling fluids Nos. 2, 3, and 4 have higher gel strengths and are more thixotropic than said drilling fluid No. 1. Thus, based on these data, said drilling fluids 2, 3, and 4 would be superior to drilling fluid No. 1 in suspending cuttings during interruptions in drilling operations. Drilling fluids Nos. 2 and 3 show that the aqueous gels can be formed in the presence of the clay solids as in drilling fluid No. 2, or can be prepared separately and then added to the low solids fluid as in drilling fluid No. 3.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A water-base drilling fluid useful in drilling a well, comprising:

water having an initial total dissolved solids content which is not greater than about 40,000 ppm by weight;

a water thickening amount, within the range of from 0.0025 to 5 weight percent based upon the weight of said water, of a water dispersible polymer selected from the group consisting of: polyacrylamides and polymethacrylamides wherein up to about 75 percent of the carboxamide groups are hydrolyzed to carboxyl groups; previously crosslinked polyacrylamides and previously crosslinked polymethacrylamides wherein up to about 75 percent of the carboxamide groups are hydrolyzed to carboxyl groups; polyacrylic acid and polymethacrylic acid; polyacrylates; polymers of N-substituted acrylamides wherein the nitrogen atoms in the carboxamide groups have from 1 to 2 alkyl substituents which contain from 1 to 4 carbon atoms, and wherein up to about 75 percent of the carboxamide groups are hydrolyzed to carboxyl groups; copolymers of acrylamide or methacrylamide with another ethylenically unsaturated monomer copolymerizable therewith, sufficient acrylamide or methacrylamide being present in the monomer mixture to impart said water-dispersible properties to the resulting copolymer when it is mixed with water, and wherein up to about 75 percent of the carboxamide groups are hydrolyzed to carboxyl groups; and mixtures of said polymers;

an amount, within the range of from 0.05 to 60 weight percent based upon the weight of said polymer, of a water-soluble compound of chromium selected from the group consisting of ammonium chromate, ammonium dichromate, the alkali metal chromates and dichromates, chromium trioxide, and mixtures thereof, wherein the chromium present is capable of being reduced from $+6$ valence to $+3$ valence, and which amount is sufficient to cause gelation of said water containing said polymer when the valence of at least a portion of said chromium is reduced to said lower valence state;

an amount of a water-soluble reducing agent selected from the group consisting of hydroquinone, sodium sulfide, sodium hydrosulfite, sodium metabisulfite, potassium sulfite, sodium bisulfite, potassium hydrosulfrite, potassium metabisulfite, sodium sulfite, sodium thiosulfate, ferrous sulfate, hydrogen sulfide, ferrous chloride, p-hydrazinobenzoic acid, hydrazine phosphite, hydrazine dihydrochloride, thioacetamide, and mixtures thereof, and which is effective to reduce at least a portion of said chromium to said lower valence state and cause said gelation, said amount being within the range of from 0.1 to about 200 percent of the stoichiometric amount required to reduce said chromium to said lower valence state; and sufficient suspended finely divided solids to form a filter cake on the wall of said well.

2. A water-base drilling fluid according to claim 1 wherein said water is an essentially fresh water.

3. A water base drilling fluid according to claim 1 wherein:

the amount of said finely divided solids is not more than about 12 volume percent.

4. A water-base drilling fluid according to claim 3 wherein:

said water is an essentially fresh water and;

said polymer is a substantially linear polymer of acrylamide;

the amount of said chromuim compound is within the range of from 0.5 to 30 weight percent, based upon the weight of said polymer.

5. A water base drilling fluid according to claim 3 wherein the amount of said finely divided solids is not more than about 5 volume percent.

6. A water-base drilling fluid according to claim 3 wherein:

said polymer is a substantially linear polyacrylamide;

said chromium compound is sodium dichromate or potassium dichromate;

said reducing agent is selected from the group consisting of sodium metabisulfite, potassium metabisulfite, sodium hydrosulfite, potassium hydrosulfite, and mixtures thereof; and said finely divided solids are clay solids.

7. A water base drilling fluid according to claim 6 wherein said clay solids are selected from the group consisting of bentonite, montmorillonite clays; and mixtures thereof.

8. A water base drilling fluid according to claim 3 wherein:

the amount of said chromium compound is within the range of from 0.5 to 30 weight percent, based upon the weight of said polymer;

said polymer is a substantially linear polymer of acrylamide; and said finely divided solids are clay solids and are present in an amount of not more than about 5 volume percent.

9. A water base drilling fluid according to claim 8 wherein said chromium compound is selected from the group consisting of sodium dichromate, potassium dichromate, and mixtures thereof.

10. A water base drilling fluid according to claim 9 wherein the amount of said polymer, the amount of said chromium compound, and the amount of said reducing agent are sufficient to provide from 0.05 to about 1.5 pounds of aqueous gel per barrel of said drilling fluid.

11. A method for preparing a water-base drilling fluid comprising an aqueous gel, and useful in drilling a well, which method comprises incorporating into water having an initial total dissolved solids content which is not greater than about 40,000 ppm by weight;

a water thickening amount, within the range of from 0.0025 to 5 weight percent based upon the weight of said water, of a water dispersible polymer selected from the group consisting of: polyacrylamides and polymethacrylamides wherein up to about 75 percent of the carboxamide groups are hydrolyzed to carboxyl groups; previously crosslinked polyacrylamides and previously crosslinked polymethacrylamides wherein up to about 75 percent of the carboxamide groups are hydrolyzed to carboxyl groups; polyacrylic acid and polymethacrylic acid; polyacrylates; polymers of N-substituted acrylamides wherein the nitrogen atoms in the carboxamide groups have from 1 to 2 alkyl substituents which contain from 1 to 4 carbon atoms, and wherein up to about 75 percent of the carboxamide groups are hydrolyzed to carboxyl groups; copolymers of acrylamide or methacrylamide with another ethylenically unsaturated monomer copolymerizable therewith, sufficient acrylamide or methacrylamide being present in the monomer mixture to impart said water-dispersible properties to the resulting copolymer when it is mixed with water, and wherein up to about 75 percent of the carboxamide groups are hydrolyzed to carboxyl groups; and mixtures of said polymers;

an amount, within the range of from 0.05 to 60 weight percent based upon the weight of said polymer, of a water-soluble compound of chromium selected from the group consisting of ammonium chromate, ammonium dichromate, the alkali metal chromates and dichromates, chromium trioxide, and mixtures thereof, wherein the chromium present is capable of being reduced from +6 valence to +3 valence, and which amount is sufficient to cause gelation of said water containing said polymer when the valence of at least a portion of said chromium is reduced to said lower valence state;

an amount of a water-soluble reducing agent selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, hydrogen sulfide, ferrous chloride, p-hydraxinobenzoic acid, hydrazine phosphite, hydrazine dihydrochloride, thioacetamide, and mixtures thereof, and which is effective to reduce at least a portion of said to chromium to said lower valence state and cause said gelation, said amount being within the range of from 0.1 to about 200 percent of the stoichiometric amount required to reduce said chromium to said lower valence state; and sufficient suspended finely divided solids to form a filter cake on the wall of said well.

12. A method according to claim 11 wherein:

the amount of said finely divided solids is not more than about 12 volume percent.

13. A method according to claim 12 wherein:

the amount of said chromium compound is within the range of from 0.5 to 30 weight percent, based upon the weight of said polymer;

said polymer is a substantially linear polymer of acrylamide; and said finely divided solids are present in an amount of not more than about 5 volume percent.

14. A method according to claim 13 wherein said polymer is a polyacrylamide.

15. A method for preparing a water-base drilling fluid comprising an aqueous gel, and useful in drilling a well, which method comprises, in combination, the steps of:

(a) suspending in water having an initial total dissolved solids content which is not greater than about 40,000 ppm by weight, an amount of finely divided clay solids sufficient to form a filter cake on the wall of said well;

(b) incorporating in said water a water-thickening amount, within the range of from 0.0025 to 5 weight percent based upon the weight of said water, of a water dispersible polymer selected from the group consisting of: polyacrylamides and polymethacrylamides wherein up to about 75 percent of the carboxamide groups are hydrolyzed to carboxyl groups; previously crosslinked polyacrylamides and previously crosslinked polymethacrylamides wherein up to about 75 percent of the carboxamide groups are hydrolyzed to carboxyl groups; polyacrylic acid and polymethacrylic acid; polyacrylates; polymers of N-substituted acrylamides wherein the nitrogen atoms in the carboxamide groups have from 1 to 2 alkyl substituents which contain from 1 to 4 carbon atoms, and wherein up to about 75 percent of the carboxamide groups are hydrolyzed to carboxyl groups; copolymers of acrylamide or methacrylamide with another ethylenically unsaturated monomer copolymerizable therewith, sufficient acrylamide or methacrylamide being present in the monomer mixture to impart said water-dispersible properties to the resulting copolymer when it is mixed with water, and wherein up to about 75 percent of the carboxamide groups are hydrolyzed to carboxyl groups; and mixtures of said polymers;

(c) then adding to said water containing said clay solids and said polymers, one of (1) an amount, within the range of from 0.05 to 60 weight percent based upon the weight of said polymer, of a water-soluble compound of chromium selected from the group consisting of ammonium chromate, ammonium dichromate, the alkali metal chromates and dichromates, chromium trioxide, and mixtures thereof, wherein the chromium present is capable of being reduced from +6 valence to +3 valence, and which amount is sufficient to cause gelation of said water containing said polymer when the valence of at least a portion of said chromium is reduced to said lower valence state, and (2) an amount of a watersoluble reducing agent selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, hydrogen sulfide, ferrous chloride, p-hydrazinobenzoic acid, hydrazine phosphite, hydrazine dihydrochloride, thioacetamide, and mixtures thereof, and which is effective to reduce at least a portion of said chromium to said lower valence state and cause said gelation, said amount being within the range of from 0.1 to about 200 percent of the stoichiometric amount required to reduce said chromium to said lower valence state and (d) then adding to said water the other of said reagents (1) and (2) which was not added thereto in step (c).

16. A method according to claim 15 wherein:
the amount of said solids is within the range of up to about 12 volume percent of the final drilling fluid composition.

17. A method according to claim 16 wherein:
the amount of said chromium compound is within the range of from 0.5 to 30 weight percent, based upon the weight of said polymer;
said polymer is a substantially linear polymer of acrylamide; and
said finely divided solids are present in an amount of not more than about 5 volume percent.

18. A method according to claim 17 wherein said polymer is a polyacrylamide.

19. A method for preparing a water-base drilling fluid containing an aqueous gel, and useful in drilling a well, which method comprises, in combination, the steps of:
(a) thickening water having an initial total dissolved solids content which is not greater than about 40,000 ppm by weight, by adding thereto from 0.1 to 5 weight percent, based on the weight of said water, of a water-dispersible polymer selected from the group consisting of: polyacrylamides and polymethacrylamides wherein up to about 75 percent of the carboxamide groups are hydrolyzed to carboxyl groups; previously crosslinked polyacrylamides and previously crosslinked polyacrylamides wherein up to about 75 percent of the carboxamide groups are hydrolyzed to carboxyl groups; polyacrylic acid and polymethacrylic acid; polyacrylates; polymers of N-substituted acrylamides wherein the nitrogen atoms in the carboxamide groups have from 1 to 2 alkyl substituents which contain from 1 to 4 carbon atoms, and wherein up to about 75 percent of the carboxamide groups are hydrolyzed to carboxyl groups; copolymers of acrylamide or methacrylamide with another ethylenically unsaturated monomer copolymerizable therewith, sufficient acrylamide or methacrylamide being present in the monomer mixture to impart said water-dispersible properties to the resulting copolymer when it is mixed with water, and wherein up to about 75 percent of the carboxamide groups are hydrolyzed to carboxyl groups; and mixtures of said polymers;

(b) gelling the so thickened water by adding thereto from 0.5 to 30 weight percent, based on the weight of said polymer of a water-soluble compound of chromium selected from the group consisting of ammonium chromate, ammonium dichromate, the alkali metal chromates and dichromates, chromium trioxide, and mixtures thereof, wherein the valence state of the chromium therein is capable of being reduced from +6 to +3 and which is sufficient to supply at least about $3 \times 10^{-6}$ gram atoms of said chromium per gram of said polymer, and an amount of a water-soluble reducing agent selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, hydrogen sulfide, ferrous chloride, p-hydrazinobenzoic acid, hydrazine phosphite, hydrazine dihydrochloride, thioacetamide, and mixtures thereof, and which is effective to reduce at least a portion of said chromium to said lower valence state, said amount being within the range of from 0.1 to about 200 percent of the stoichiometric amount required to reduce said chromium to said lower valence state;

(c) preparing a base drilling fluid by suspending in water an amount of finely divided clay solids sufficient to form a filter cake on the wall of said well; and (d) incorporating said aqueous gel prepared in steps (a) and (b) into said base drilling fluid in an amount sufficient to provide from 0.05 to about 1.5 pounds of said gel per barrel of final drilling fluid.

20. A method according to claim 19 wherein said gel prepared in steps (a) and (b) is diluted after step (b) and prior to being incorporated in said base drilling fluid in step (d).

21. A method according to claim 20 wherein:
said polymer is a substantially linear polymer of acrylamide; and
said finely divided solids are present in an amount of not more than about 5 volume percent.

22. A method according to claim 21 wherein said polymer is a polyacrylamide.

* * * * *

UNITED STATES PATENT AND TRADEMARK OFFICE
CERTIFICATE OF CORRECTION

PATENT NO. : 4,076,628
DATED : Feb. 28, 1978
INVENTOR(S) : Richard L. Clampitt and James E. Hessert It is certified that error appears in the above-identified patent and that said Letters Patent are hereby corrected as shown below:

Item [75], change to read

---Inventors: Richard L. Clampitt and
James E. Hessert, both of
Bartlesville, Okla.---

Signed and Sealed this

Twenty-ninth Day of August 1978

[SEAL]

Attest:

RUTH C. MASON
Attesting Officer

DONALD W. BANNER
Commissioner of Patents and Trademarks